US012608526B2

(12) United States Patent
Kim et al.

(10) Patent No.: US 12,608,526 B2
(45) Date of Patent: Apr. 21, 2026

(54) TEMPERATURE MARGIN SETTING METHOD FOR 3D INTEGRATED CIRCUIT

(71) Applicant: Samsung Electronics Co., Ltd., Suwon-si (KR)

(72) Inventors: Ki-Ok Kim, Suwon-si (KR); Jingon Lee, Suwon-si (KR); Mijeong Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 18/061,636

(22) Filed: Dec. 5, 2022

(65) Prior Publication Data

US 2023/0385497 A1 Nov. 30, 2023

(30) Foreign Application Priority Data

May 31, 2022 (KR) ........................ 10-2022-0067206

(51) Int. Cl.
*G06F 30/3315* (2020.01)
*G06F 119/08* (2020.01)
*G06F 119/12* (2020.01)

(52) U.S. Cl.
CPC ...... *G06F 30/3315* (2020.01); *G06F 2119/08* (2020.01); *G06F 2119/12* (2020.01)

(58) Field of Classification Search
CPC ............. G06F 30/3315; G06F 2119/08; G06F 2119/12; G06F 30/398; G06F 30/394; G06F 2115/06
See application file for complete search history.

(56) References Cited

U.S. PATENT DOCUMENTS

| | | | |
|---|---|---|---|
| 7,823,102 B2 | 10/2010 | Chandra et al. | |
| 8,566,762 B2 | 10/2013 | Morimoto et al. | |
| 8,797,054 B2 | 8/2014 | Liao et al. | |
| 9,672,308 B1 * | 6/2017 | Majumder | G06F 30/30 |
| 9,721,868 B2 | 8/2017 | Lin et al. | |
| 10,678,985 B2 | 6/2020 | Sinha et al. | |
| 10,747,929 B1 * | 8/2020 | Fraisse | G06F 30/36 |
| 2009/0024969 A1 | 1/2009 | Chandra | |
| 2009/0044156 A1 | 2/2009 | Chandra et al. | |
| 2013/0019214 A1 * | 1/2013 | Morimoto | G06F 30/327 716/101 |
| 2013/0298101 A1 * | 11/2013 | Chandra | G06F 30/398 716/136 |
| 2015/0112646 A1 | 4/2015 | Kamal et al. | |

(Continued)

*Primary Examiner* — Nha T Nguyen
(74) *Attorney, Agent, or Firm* — Wolf, Greenfield & Sacks, P.C.

(57) ABSTRACT

A method of designing a 3D integrated circuit includes generating a distance-delay table with respect to at least one of a first chip or a second chip stacked on the first chip, based on a thermal analysis result, calculating a first timing path distance with respect to a first timing path corresponding to the first chip in a 3D signal transfer path, calculating a second timing path distance with respect to a second timing path corresponding to the second chip in the 3D signal transfer path, calculating a 3D timing path distance by summing the first timing path distance and the second timing path distance, and setting a temperature margin with respect to a 3D timing path based on the distance-delay table and the 3D timing path distance.

20 Claims, 12 Drawing Sheets

(56)             References Cited

U.S. PATENT DOCUMENTS

| | | | |
|---|---|---|---|
| 2015/0227668 A1* | 8/2015 | Liu | G06F 30/394 |
| | | | 716/130 |
| 2019/0303523 A1* | 10/2019 | Xu | H01L 23/5226 |
| 2020/0301490 A1 | 9/2020 | Thomas et al. | |
| 2022/0312585 A1* | 9/2022 | Kang | B23K 31/125 |
| 2023/0306180 A1* | 9/2023 | Sripada | G06F 1/12 |
| 2025/0141439 A1* | 5/2025 | Chung | H03K 5/133 |

* cited by examiner

Thermal Analysis Tool                    ~1230

Thermal Gradient Analysis Module          ~1231

Temperature-Delay Analysis Module         ~1232

Distance-Delay Analysis Module            ~1233

| Coordinate (X/Y) | 10 | 20 | 30 | 40 |
|---|---|---|---|---|
| 10 | 10°C | 10°C | 10°C | 10°C |
| 20 | 10°C | 20°C | 10°C | 10°C |
| 30 | 10°C | 10°C | 30°C | 20°C |
| 40 | 10°C | 10°C | 10°C | 10°C |

[Coordinate-Temperature Table]

[Distance-Temperature Graph]

| Temperature | 10°C | 20°C | 10°C | 10°C |
|---|---|---|---|---|
| LVT | 2% | 2% | 3% | 4% |
| RVT | 3% | 3% | 5% | 6% |
| SLVT | 2% | 2% | 4% | 5% |

[Temperature-Delay Table]

| Distance | 10μm | 20μm | 30μm | 40μm |
|----------|------|------|------|------|
| LVT | 2% | 2% | 3% | 4% |
| RVT | 3% | 3% | 5% | 6% |
| SLVT | 2% | 2% | 4% | 5% |

[Distance-Delay Table]

STA Tool — 1250

3D Distance Calculation Module — 1251

Temperature Margin Decision Module — 1252

2D timing path distance

Logic Circuit 2

Logic Circuit 1

Die 2

Die 1

3D timing path distance

Logic Circuit 2

D2

Die 2

D1

Logic Circuit 1

Die 1

3D timing path distance = D1 +D2

| Distance | 10μm | 20μm | 30μm | 40μm |
|----------|------|------|------|------|
| LVT      | 4%   | 5%   | 6%   | 7%   |
| RVT      | 4%   | 5%   | 5%   | 6%   |
| SLVT     | 4%   | 4%   | 4%   | 5%   |

FIG.10
| Distance | 10μm | 20μm | 30μm | 40μm |
|----------|------|------|------|------|
| LVT | 2% | 2% | 3% | 4% |
| RVT | 3% | 3% | 5% | 6% |
| SLVT | 2% | 2% | 4% | 5% |
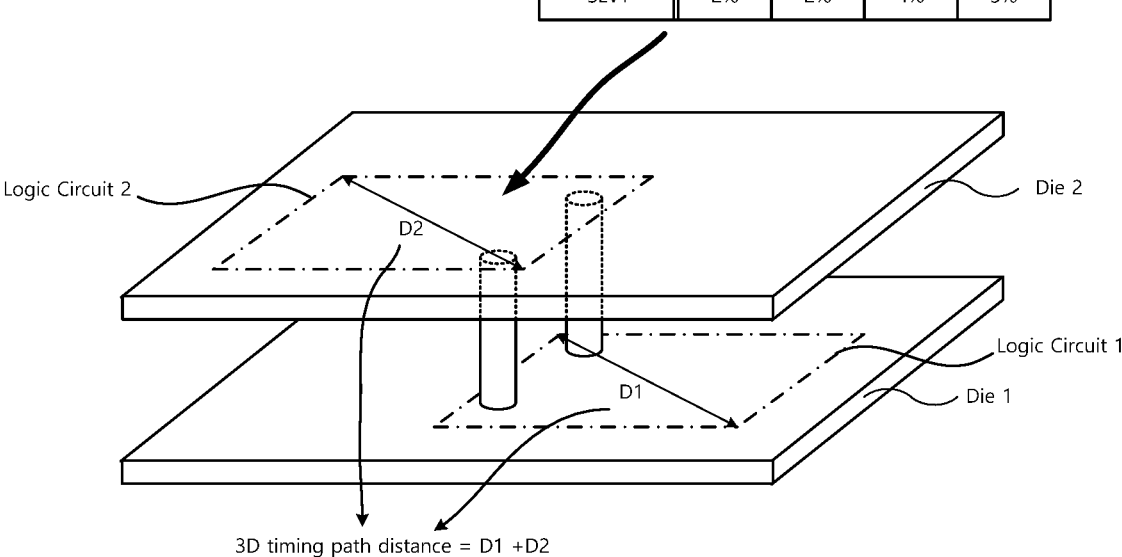

FIG.11
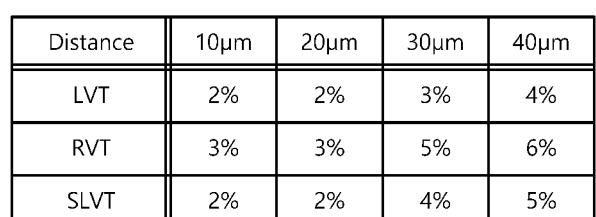
| Distance | 10μm | 20μm | 30μm | 40μm |
|----------|------|------|------|------|
| LVT | 2% | 2% | 3% | 4% |
| RVT | 3% | 3% | 5% | 6% |
| SLVT | 2% | 2% | 4% | 5% |
[2nd Distance-Delay Table]
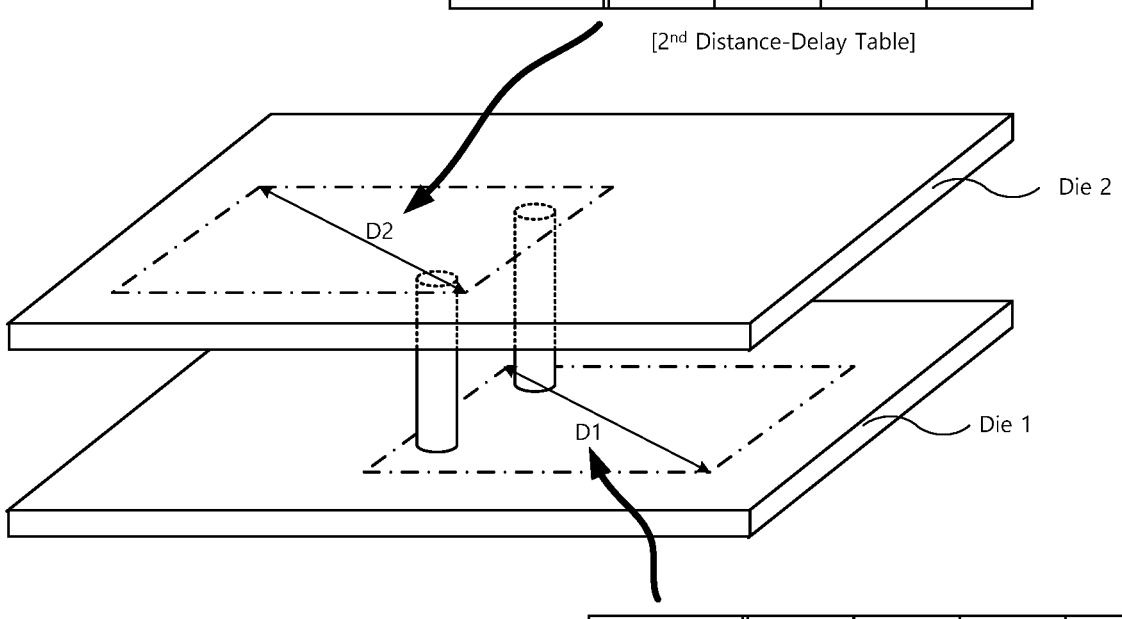
| Distance | 10μm | 20μm | 30μm | 40μm |
|----------|------|------|------|------|
| LVT | 4% | 5% | 6% | 7% |
| RVT | 4% | 5% | 5% | 6% |
| SLVT | 4% | 4% | 4% | 5% |
[1st Distance-Delay Table]

FIG.12

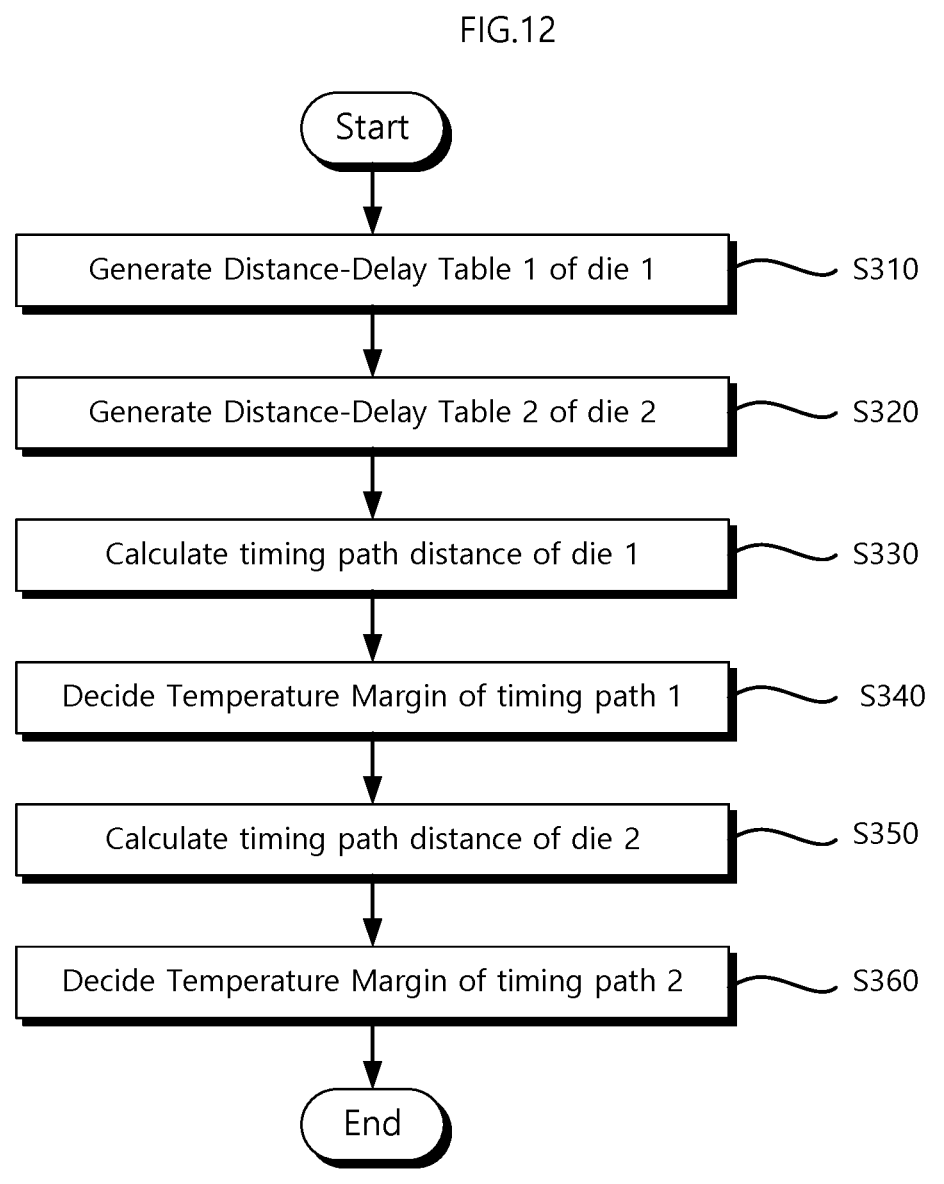

```
                    ┌─────────┐
                    │  Start  │
                    └────┬────┘
                         │
                         ▼
  ┌────────────────────────────────────────────────┐
  │    Generate Distance-Delay Table 1 of die 1     │ ⸺ S310
  └────────────────────────┬───────────────────────┘
                           │
                           ▼
  ┌────────────────────────────────────────────────┐
  │    Generate Distance-Delay Table 2 of die 2     │ ⸺ S320
  └────────────────────────┬───────────────────────┘
                           │
                           ▼
  ┌────────────────────────────────────────────────┐
  │        Calculate timing path distance of die 1  │ ⸺ S330
  └────────────────────────┬───────────────────────┘
                           │
                           ▼
  ┌────────────────────────────────────────────────┐
  │    Decide Temperature Margin of timing path 1   │ ⸺ S340
  └────────────────────────┬───────────────────────┘
                           │
                           ▼
  ┌────────────────────────────────────────────────┐
  │        Calculate timing path distance of die 2  │ ⸺ S350
  └────────────────────────┬───────────────────────┘
                           │
                           ▼
  ┌────────────────────────────────────────────────┐
  │    Decide Temperature Margin of timing path 2   │ ⸺ S360
  └────────────────────────┬───────────────────────┘
                           │
                           ▼
                    ┌─────────┐
                    │   End   │
                    └─────────┘
```

FIG.13

Logic Circuit 2

Die 2

D2

D3

D1

Logic Circuit 1

Die 1

3D timing path distance = D1 +D2 +D3

| Distance | 10μm | 20μm | 30μm | 40μm |
|----------|------|------|------|------|
| LVT | 4% | 5% | 6% | 7% |
| RVT | 4% | 5% | 5% | 6% |
| SLVT | 4% | 4% | 4% | 5% |

1

TEMPERATURE MARGIN SETTING METHOD FOR 3D INTEGRATED CIRCUIT

CROSS-REFERENCE TO RELATED APPLICATIONS

This application claims priority under 35 U.S.C. § 119 to Korean Patent Application No. 10-2022-0067206, filed on May 31, 2022, in the Korean Intellectual Property Office, the disclosures of which are incorporated by reference herein in their entireties.

FIELD

Embodiments of the present disclosure relate to a method for designing an integrated circuit, and more particularly, relate to a method for setting a temperature margin for a 3D (three-dimensional) integrated circuit.

BACKGROUND

Memory devices or application-specific integrated circuits (ASICs) may be released as products through a series of steps such as a semiconductor circuit design, process, chip test, or post-package test. To find a timing error existing on a circuit during very large scale integration (VLSI) design, dynamic timing analysis (DTA) or static timing analysis (STA) may be performed.

Static timing analysis (STA) may not apply a specific type of test input, but may find and analyze a path that may exhibit an unstable operation in consideration of multiple or all signal transfer paths existing between memory devices constituting the circuit. The static timing analysis (STA) may test whether a designed semiconductor circuit or logic can operate normally without timing problems by analyzing timings between signals input and output to the designed semiconductor circuit or logic.

In addition, when designing the semiconductor circuits, an OCV (On-Chip Variation) margin is typically set in consideration of the on-chip variation. The OCV margin includes a temperature margin, and in particular, since a speed of the semiconductor circuit may be affected by temperature, it may be important to set an appropriate temperature margin. When designing a conventional 2D semiconductor circuit, a maximum temperature margin technique may be used as a temperature margin. However, in the case of the 3D semiconductor circuit, as the distance between the stacked dies becomes shorter, the chip temperature increases compared to that of the 2D semiconductor circuit. Therefore, when the maximum temperature margin technique is used as in the case of designing the 2D semiconductor circuit, the maximum temperature margin to be applied increases rapidly, which can cause problems due to deterioration of chip performance.

SUMMARY

Embodiments of the present disclosure provide a 3D integrated circuit design method capable of reducing or preventing performance degradation and occurrence of problems in a 3D integrated circuit.

According to some embodiments, a method of designing a three-dimensional (3D) integrated circuit includes generating a distance-delay table with respect to at least one of a first chip or a second chip stacked on the first chip, based on a thermal analysis result; calculating a first timing path distance with respect to a first timing path corresponding to the first chip in a 3D signal transfer path; calculating a second timing path distance with respect to a second timing path corresponding to the second chip in the 3D signal transfer path; calculating a 3D timing path distance by summing the first timing path distance and the second timing path distance; and setting a temperature margin based on the distance-delay table and the 3D timing path distance.

According to some embodiments, a method of designing a three-dimensional (3D) integrated circuit includes generating a first distance-delay table with respect to a first chip, based on a thermal analysis result; generating a second distance-delay table with respect to a second chip stacked on top of the first chip, based on the thermal analysis result; calculating a first timing path distance with respect to a first timing path corresponding to the first chip in a 3D signal transfer path; setting a first temperature margin with respect to the first timing path based on the first distance-delay table and the first timing path distance; calculating a second timing path distance with respect to a second timing path corresponding to the second chip in the 3D signal transfer path; and setting a second temperature margin with respect to the second timing path based on the second distance-delay table and the second timing path distance.

According to some embodiments, an apparatus for designing a three-dimensional (3D) integrated circuit includes a memory device; and a processor that is configured to load a design tool into the memory device and execute the design tool that is loaded. The design tool includes a thermal analysis tool configured to generate a distance-delay table with respect to at least one of a first chip or a second chip stacked on the first chip, based on a thermal analysis result; and a static timing analysis tool configured to calculate a first timing path distance corresponding to the first chip and a second timing path distance corresponding to the second chip in a 3D signal transfer path, and to set a temperature margin with respect to the 3D signal transfer path based on the first and second timing path distances and the distance-delay table.

BRIEF DESCRIPTION OF THE DRAWINGS

A detailed description of each drawing is provided to facilitate a more thorough understanding of the drawings referenced in the detailed description of the present disclosure.

FIG. 10 is a diagram illustrating a temperature margin setting method, according to another embodiment of the present disclosure.

FIG. 11 is a diagram illustrating a temperature margin setting method, according to another embodiment of the present disclosure.

FIG. 12 is a flowchart illustrating an operation of a temperature margin setting method of FIG. 11.

FIG. 13 is a diagram illustrating a temperature margin setting method, according to another embodiment of the present disclosure.

DETAILED DESCRIPTION OF EMBODIMENTS

Hereinafter, embodiments of the present disclosure may be described in detail and clearly to such an extent that an ordinary one in the art easily implements the present disclosure. The terms "first," "second," "third," etc., may be used herein merely to distinguish one element from another.

Figure 1:
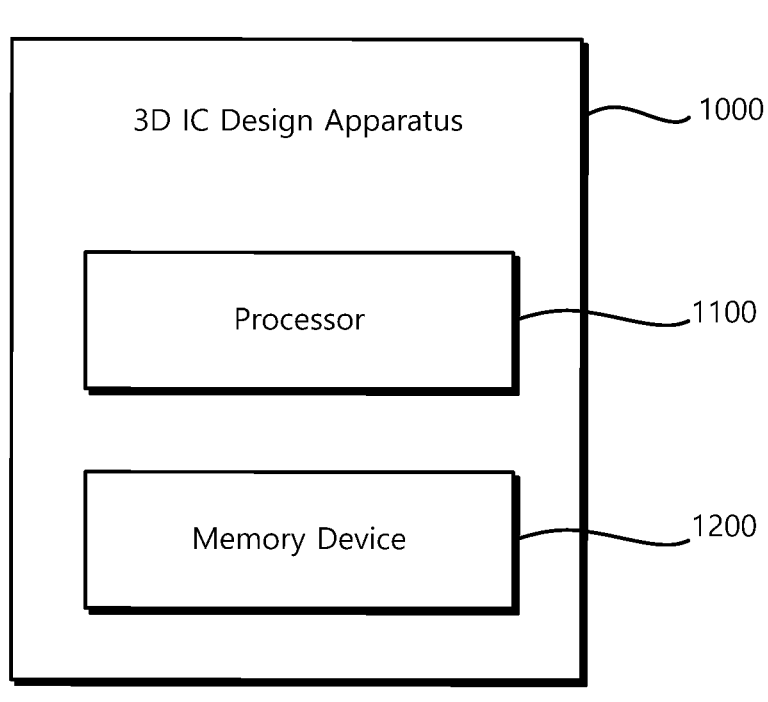
FIG. 1 is a diagram illustrating an apparatus for designing a 3D integrated circuit, according to an embodiment of the present disclosure.

FIG. 1 is a diagram illustrating an apparatus 1000 for designing a 3D (three-dimensional) integrated circuit, according to an embodiment of the present disclosure. Referring to FIG. 1, the 3D integrated circuit (IC) design apparatus 1000 includes a processor 1100 and a memory device 1200.

The processor 1100 may load a design tool, such as an electronic design automation (EDA) tool, into the memory device 1200. A "tool" as used herein (or module thereof) may include computer readable program code comprising computer program instructions stored in a non-transitory computer readable storage medium, which, when executed, causes the processor 1100 to perform operations as described herein. For example, the processor 1100 may load a design tool into the memory device 1200 from a storage device such as a solid state drive, a hard disk drive, or a CD-ROM.

The processor 1100 may execute the design tool to implement an integrated circuit. The design tool executed by the processor 1100 may implement the integrated circuit based on, for example, a library and design information. In this case, the integrated circuit may be a system-on-chip (SOC), an application-specific integrated circuit (ASIC), or a field programmable gate array (FPGA).

The processor 1100 may execute a thermal analysis tool and a static timing analysis tool as described below. The static timing analysis tool executed by the processor 1100 may verify timing of devices, circuits, logic, etc. constituting the integrated circuit based on the timing parameters included in the library.

In an embodiment of the present disclosure, the 3D integrated circuit design apparatus 1000 provides a design function for (e.g., may be used to design) a 3D semiconductor integrated circuit. In this case, the 3D semiconductor integrated circuit includes a plurality of vertically stacked semiconductor chips. For example, the 3D semiconductor integrated circuit may include a first chip and a second chip stacked on the first chip, and signal transfer paths may be formed between devices (e.g., transistors and/or other circuit elements) formed in each chip. Among the signal transfer paths, a signal transfer path formed via both the first chip and the second chip may be defined as a 3D signal transfer path.

When setting the temperature margin, the 3D integrated circuit design apparatus 1000 according to an embodiment of the present disclosure may not use the maximum temperature margin techniques used in the 2D integrated circuit design. Instead, the 3D integrated circuit design apparatus 1000 according to an embodiment of the present disclosure may calculate a distance of a timing path corresponding to each of the vertically stacked chips, and may set the temperature margin based on the calculated distance of each timing path. Accordingly, deterioration of chip performance and/or occurrence of problems due to excessive setting of the temperature margin may be prevented.

Figure 2:
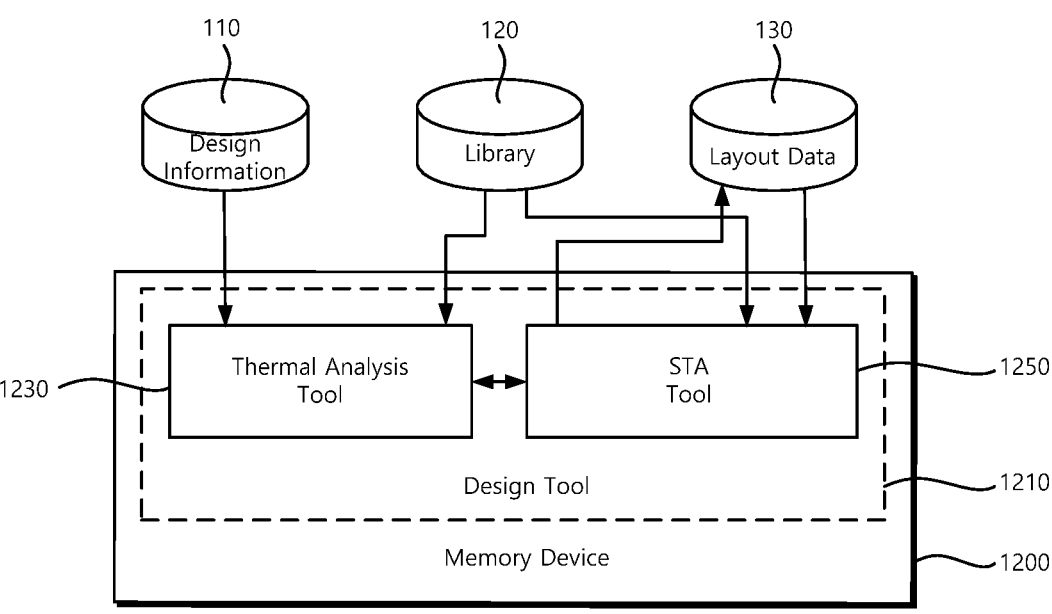
FIG. 2 is a diagram illustrating an example of a design tool loaded into a memory device of FIG. 1.

FIG. 2 is a diagram illustrating an example of a design tool loaded into the memory device 1200 of FIG. 1.

Referring to FIG. 2, a design tool 1210 may be loaded into the memory device 1200, and the design tool 1210 may include a thermal analysis tool 1230 and a static timing analysis tool 1250. In addition, design information 110, a library 120, and layout data 130 are loaded into the memory device 1200, and may be provided to the thermal analysis tool 1230 and the static timing analysis tool 1250.

The design information 110 may include types of devices (e.g., standard cells) included in the integrated circuit and a netlist indicating a connection relationship between the devices. For example, the netlist may be written in a Hardware Description Language (HDL) such as a Verilog.

The design information 110 may include parasitic data information (e.g., Standard Parasitic Exchange Format (SPEF) information) indicating resistance, capacitance, and inductance of wires included in the integrated circuit, and/or design constraint information (e.g., Synopsys Design Constraint (SDC) information) indicating timing constraints required by the integrated circuit.

The library 120 may include local random variation information LRVI and global variation information GVI with respect to devices included in the integrated circuit. In addition, the library 120 may further include delay information, function definitions, power information, noise information, etc. with respect to devices included in the integrated circuit.

The layout data 130 may include data generated by arranging and connecting components of the integrated circuit based on the design information 110 and the library 120. In this case, the layout is a process of creating data that may be necessary for manufacturing a mask for implementing an integrated circuit on a wafer, and may refer to a series of operations for arranging and wiring semiconductor devices (e.g., transistors, resistors, capacitors, etc.) having electrical characteristics in accordance with the layout design rule required in the semiconductor process, according to a designed circuit. For example, the layout data 130 with respect to the integrated circuit may be generated by arranging and connecting devices of the integrated circuit in a place and routing stage.

The layout data 130 may include data on thermal resistance and current consumption corresponding to devices disposed on each of a plurality of chips constituting the 3D integrated circuit. In a 3D integrated circuit, a different layout structure may be implemented in each of a plurality of vertically stacked chips, and thermal resistance and current consumption of devices constituting the different chip layouts may be different from each other. By arranging and connecting the devices of the 3D integrated circuit in the placing and routing stage, the layout data 130 with respect to thermal resistance and current consumption of devices arranged on different chips may be generated.

The thermal analysis tool 1230 is executed by the processor 1100 (refer to FIG. 1), and receives information on thermal resistance, current consumption, temperature, etc. of devices constituting the 3D integrated circuit from the layout data 130. The thermal analysis tool 1230 performs a thermal analysis operation on the devices constituting the 3D integrated circuit, and through this, may generate a delay deviation table (hereinafter, a distance-delay table) according to a distance. A "table" as used herein may refer to a collection of data or data structure that is stored in a non-transitory computer readable storage medium. In this case, a delay variation included in the distance-delay table may be a value set in consideration of temperature change.

The static timing analysis tool 1250 is executed by the processor 1100, and receives a 3D signal transfer path from the layout data 130. The static timing analysis tool 1250 calculates a distance of a timing path corresponding to each chip in the 3D signal transfer path. Further, the static timing analysis tool 1250 receives the distance-delay table from the thermal analysis tool 1230 and decides a temperature margin based on the distance of the timing path corresponding to each chip and the distance-delay table. Accordingly, the static timing analysis tool 1250 may set an accurate temperature margin corresponding to the 3D signal transfer path.

Figures 3, 4A:
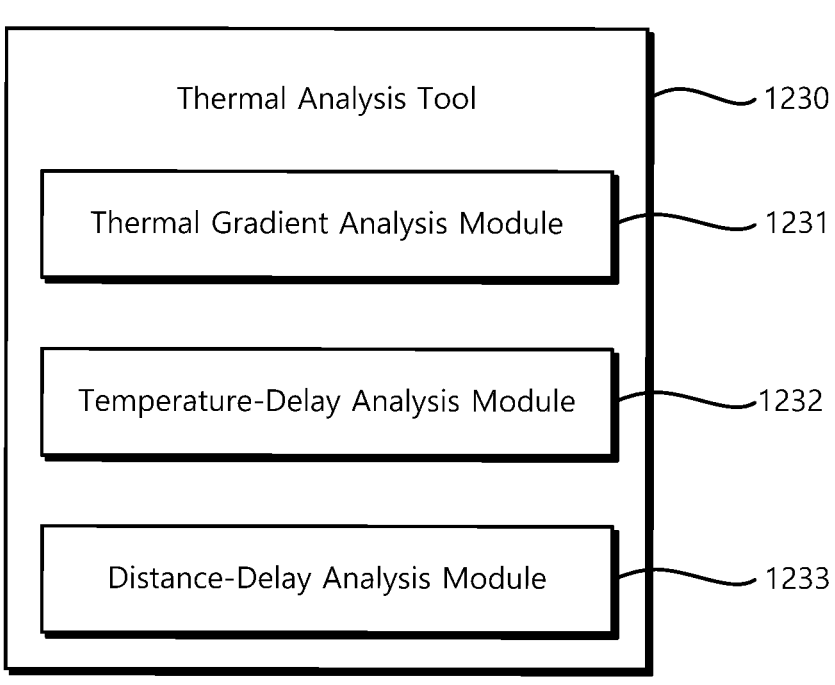
FIG. 3 is a diagram illustrating an example of the thermal analysis tool of FIG. 2.
FIGS. 4A, 4B, 4C, and 4D are diagrams illustrating an example of an execution result of a thermal analysis tool.

FIG. 3 is a diagram illustrating an example of the thermal analysis tool 1230 of FIG. 2. FIGS. 4A to 4D are diagrams illustrating an example of an execution result of the thermal analysis tool 1230.

Referring to FIG. 3, the thermal analysis tool 1230 includes a thermal gradient analysis module 1231, a temperature-delay analysis module 1232, and a distance-delay analysis module 1233.

The thermal gradient analysis module 1231 performs a thermal analysis operation with respect to each of the plurality of vertically stacked chips. For example, the thermal gradient analysis module 1231 may be implemented through a Redhawk-SC tool, and may obtain a temperature distribution for each device constituting the 3D integrated circuit through thermal analysis. For example, the location of each device may be specified through X and Y coordinates. In this case, the thermal gradient analysis module 1231 may generate a coordinate-temperature table that includes information on the temperature distribution according to the coordinates of each device through thermal analysis, as illustrated in FIG. 4A.

Figures 4B, 4C:
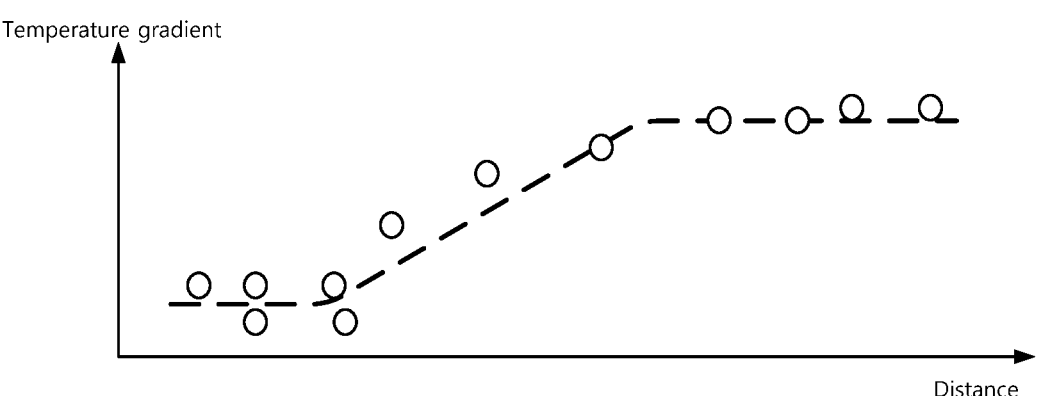

Also, the thermal gradient analysis module 1231 may analyze a distance difference and a temperature difference between each device based on the coordinate-temperature table. As illustrated in FIG. 4B, the thermal gradient analysis module 1231 may generate a distance-temperature graph including information on a thermal gradient according to distance.

The temperature-delay analysis module 1232 may extract a path corresponding to each chip in the 3D signal transfer path. For example, when a 3D signal transfer path is formed on a first chip and a second chip stacked on the first chip, the temperature-delay analysis module 1232 may extract a first path corresponding to the first chip and a second path corresponding to the second chip, in the 3D signal transfer path. The temperature-delay analysis module 1232 may generate, for example, as illustrated in FIG. 4C, a temperature-delay table including information of delay variation according to a thermal gradient through a SPICE simulation.

The distance-delay analysis module 1233 may receive the distance-temperature graph from the thermal gradient analysis module 1231 and may receive the temperature-delay table from the temperature-delay analysis module 1232. The distance-delay analysis module 1233 may integrate the distance-temperature graph and the temperature-delay table, and may generate a distance-delay table including delay deviation information according to distance, as illustrated in FIG. 4D.

In this case, the distance-delay table may be generated with respect to at least one chip among a plurality of chips constituting the 3D integrated circuit. For example, when the 3D integrated circuit includes a first chip and a second chip stacked on the first chip, the thermal analysis tool 1230 may generate a first distance-delay table with respect to the first chip, or may generate a second distance-delay table with respect to the second chip. In addition, the thermal analysis tool 1230 may generate a respective distance-delay table for each of the first chip and the second chip.

Figures 4D, 5:
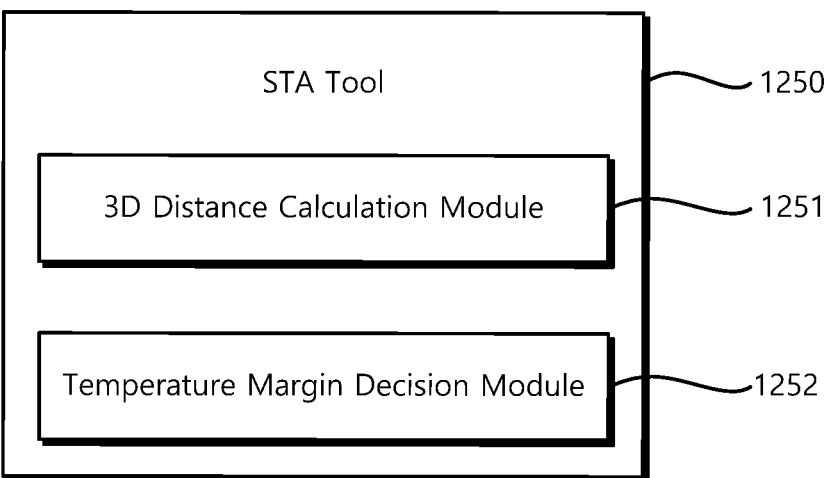
FIG. 5 is a diagram illustrating an example of a static timing analysis tool of FIG. 2.
Figure 6A:
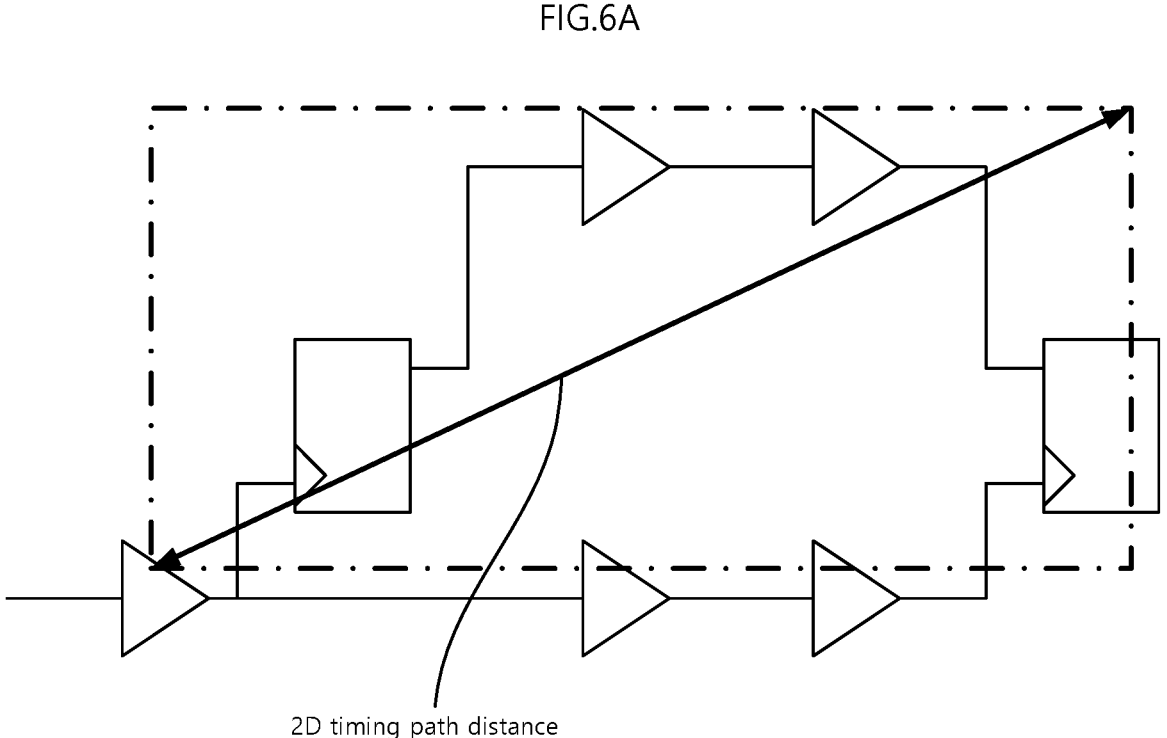
FIGS. 6A and 6B are diagrams illustrating problems when a general method of calculating a distance of a two-dimensional signal transfer path is applied to a 3D signal transfer path.
Figures 6B, 7:
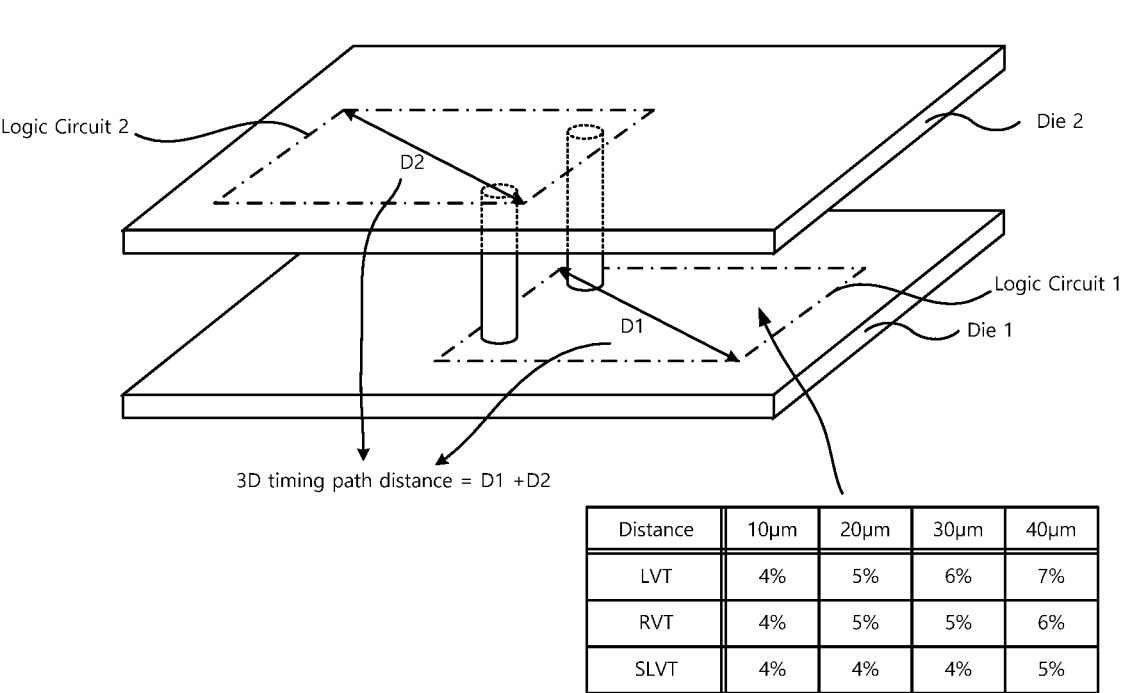
FIG. 7 is a diagram illustrating a method of calculating a distance of a 3D signal transfer path performed by a static timing analysis tool of FIG. 5.

FIG. 5 is a diagram illustrating an example of the static timing analysis tool 1250 of FIG. 2, FIGS. 6A and 6B are diagrams illustrating problems when a general method of calculating a distance of a two-dimensional signal transfer path is applied to a 3D signal transfer path, and FIG. 7 is a diagram illustrating a method of calculating a distance of a 3D signal transfer path performed by the static timing analysis tool 1250 of FIG. 5.

Referring to FIG. 5, the static timing analysis tool 1250 includes a 3D distance calculation module 1251 and a temperature margin decision module 1252.

The 3D distance calculation module 1251 extracts a respective timing path corresponding to each of the vertically stacked chips, and calculates a distance with respect to each timing path. For example, when a 3D signal transfer path is formed across the first chip and the second chip, the 3D distance calculation module 1251 may extract a first timing path corresponding to the first chip and a second timing path corresponding to the second chip. Thereafter, the 3D distance calculation module 1251 may calculate a first distance corresponding to the first timing path and a second distance corresponding to the second timing path.

In a general two-dimensional integrated circuit, a distance corresponding to a two-dimensional timing path is calculated based on coordinates. For example, as illustrated in FIG. 6A, the distance corresponding to the two-dimensional timing path may be calculated using data of a standard parasitic extraction format (SPEF), and in this case, the distance corresponding to the two-dimensional timing path may be determined based on a coordinate system.

However, when calculation technique of timing path distance based on such coordinate system is applied to a 3D signal transfer path, there is a problem in that the 3D timing path is not accurately calculated. For example, as illustrated in FIG. 6B, it is assumed that a 3D signal transfer path is formed over a first logic circuit of a first die (die 1) and a second logic circuit of a second die (die 2). Also, it is assumed that the X and Y coordinates of the first logic circuit and the second logic circuit are the same. In this case, since the coordinates of the first logic circuit and the second logic circuit are the same, the distance of the timing path calculated based on the coordinate system has a large difference from the distance of an actual timing path. For example, the timing path calculated based on the coordinate system may be calculated as illustrated in FIG. 6B, which is significantly different from the distance of the actual 3D timing path.

Therefore, to calculate the exact or more accurate distance of the 3D timing path, the 3D distance calculation module 1251 calculates the distance of the timing path corresponding to each chip, respectively. For example, as illustrated in FIG. 7, the 3D distance calculation module 1251 calculates a first timing path distance D1 corresponding to the first logic circuit of the first die, and calculates a second timing path distance D2 corresponding to the second logic circuit of the second die. Thereafter, the 3D distance calculation module 1251 may calculate the 3D timing path distance corresponding to the 3D signal transfer path by summing the first timing path D1 and the second timing path D2.

Continuingly referring to FIG. 5, the temperature margin decision module 1252 receives the distance-delay table from the thermal analysis tool 1230, and receives information on the 3D timing path distance from the 3D distance calculation module 1251. The temperature margin decision module 1252 may set the temperature margin based on the distance-delay table and the 3D timing path distance.

For example, as illustrated in FIG. 7, the temperature margin decision module 1252 may receive the distance-delay table corresponding to the first die from the thermal analysis tool 1230. In this case, the temperature margin decision module 1252 may select a delay deviation matching the 3D timing path distance from among the delay deviation values included in the distance-delay table of the first die, and may set the temperature margin based on the selected delay deviation.

Figure 8:
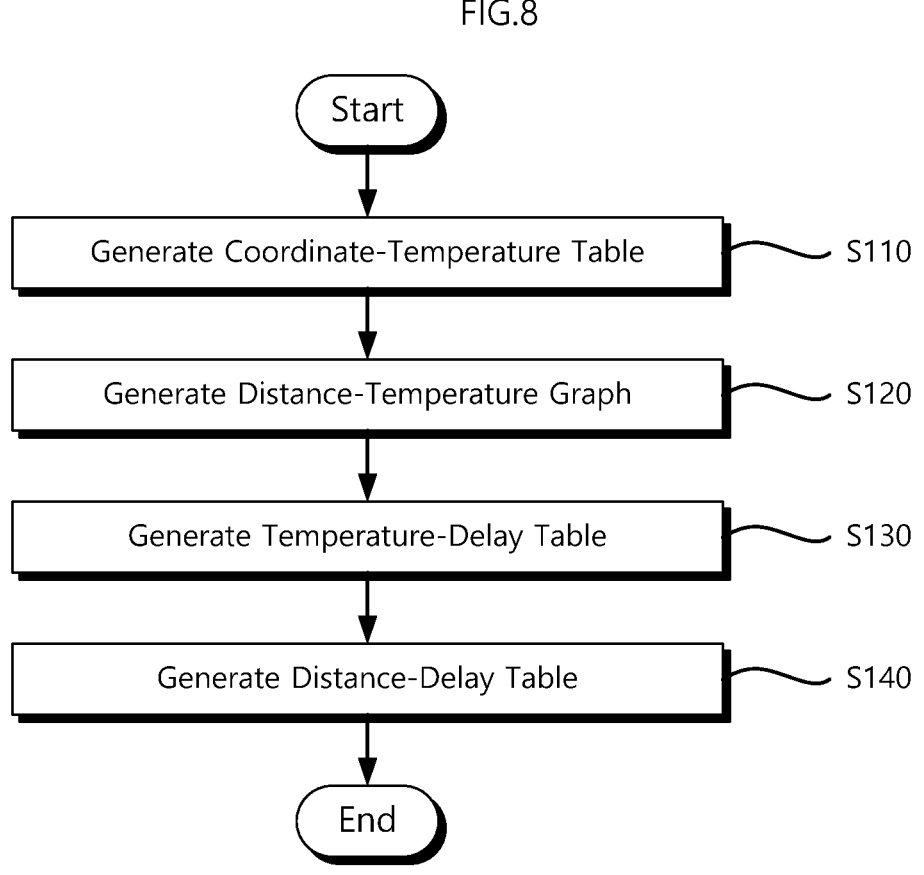
FIG. 8 is a flowchart illustrating operation of a thermal analysis tool of FIG. 3.

FIG. 8 is a flowchart illustrating an operation of the thermal analysis tool 1230 of FIG. 3.

In operation S110, the thermal analysis tool 1230 generates a coordinate-temperature table. For example, the thermal analysis tool 1230 may obtain a temperature distribution for each device constituting the 3D integrated circuit through thermal analysis, and may organize them in a table form to generate the coordinate-temperature table.

In operation S120, the thermal analysis tool 1230 generates a distance-temperature graph. For example, the thermal analysis tool 1230 may generate the distance-temperature graph by analyzing a distance difference and a temperature difference between each device based on the coordinate-temperature table.

In operation S130, the thermal analysis tool 1230 generates a temperature-delay table. For example, the thermal analysis tool 1230 may calculate a delay deviation according to a thermal gradient through the SPICE simulation, and organize it in a table form to generate the temperature-delay table.

In operation S140, the thermal analysis tool 1230 generates a distance-delay table. For example, the thermal analysis tool 1230 may generate the distance-delay table in which temperature change information is reflected by integrating the information of the distance-temperature graph and the temperature-delay table.

Figure 9:
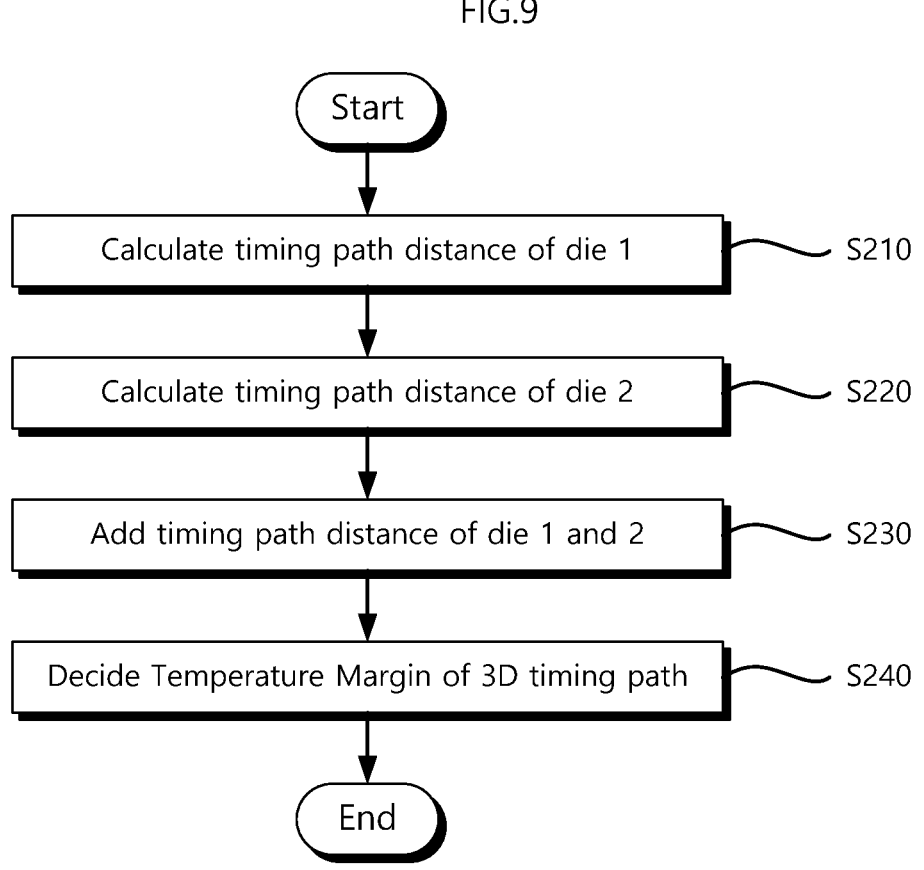
FIG. 9 is a flowchart illustrating operation of a static timing analysis tool of FIG. 5.

FIG. 9 is a flowchart illustrating an operation of the static timing analysis tool 1250 of FIG. 5. For convenience of description, it is assumed that the 3D integrated circuit includes a first chip and a second chip stacked on the first chip. In addition, it is assumed that the first chip includes a first die and a first logic circuit, the second chip includes a second die and a second logic circuit, and the 3D signal transfer path includes the first logic circuit and the second logic circuit. However, it will be understood that more than two chips, dies, and/or logic circuits may be included in the 3D integrated circuit and analyzed as described herein.

In operation S210, the static timing analysis tool 1250 calculates a first timing path distance corresponding to the first logic circuit of the first die.

In operation S220, the static timing analysis tool 1250 calculates a second timing path distance corresponding to the second logic circuit of the second die.

In operation S230, the static timing analysis tool 1250 calculates a 3D timing path distance corresponding to the 3D signal transfer path by summing the first timing path distance and the second timing path distance.

In operation S240, the static timing analysis tool 1250 selects a delay deviation value matching the 3D timing path distance from among the delay deviation values included in the distance-delay table, and sets a temperature margin based on the selected delay deviation.

As described above, when setting the temperature margin with respect to the 3D signal transfer path, the 3D integrated circuit design apparatus 1000 according to an embodiment of the present disclosure calculates a timing path distance corresponding to each stacked chip, and sets the temperature margin based on each calculated timing path distance (e.g., based on a sum of the respective calculated timing path distances). Accordingly, it is possible to accurately set the temperature margin, such that the performance of the 3D integrated circuit is improved, and the occurrence of problems due to the excessive setting of the temperature margin may be reduced or prevented.

The above description is provided by way of example, and the subject matter of the present disclosure may be adapted and applied in various ways. Hereinafter, various modifications according to an embodiment of the present disclosure will be described in more detail.

FIG. 10 is a diagram illustrating a temperature margin setting method, according to another embodiment of the present disclosure. The method of setting the temperature margin of FIG. 10 is similar to that of FIG. 7. Accordingly, additional descriptions will be omitted below to avoid redundancy.

In FIG. 7, the temperature margin is set based on the distance-delay table corresponding to the first chip, whereas the temperature margin setting method of FIG. 10 sets the temperature margin based on the distance-delay table corresponding to the second chip.

In more detail, in the case of a 3D integrated circuit having a structure in which a second chip is stacked on a first chip, the second chip, which is an upper chip, is more advantageous in heat generation than the first chip, which is a lower chip. Therefore, when the distance-delay table reflecting the temperature is formed on each of the first chip and the second chip, as illustrated in FIGS. 7 and 10, the delay deviation value corresponding to the first chip may be greater than the delay deviation value corresponding to the second chip.

Accordingly, the 3D integrated circuit design apparatus 1000 according to an embodiment of the present disclosure may select any one of a distance-delay table corresponding to the first chip or a distance-delay table corresponding to the second chip according to the characteristics of the 3D integrated circuit to set the temperature margin. For example, in the case of a 3D signal transfer path in which stable operation is relatively important, a distance-delay table corresponding to the second chip may be selected to set the temperature margin. As another example, in the case of a 3D signal transfer path in which fast operation is relatively important, a distance-delay table corresponding to the first chip may be selected to set the temperature margin.

FIG. 11 is a diagram illustrating a temperature margin setting method, according to another embodiment of the present disclosure. The method of setting the temperature margin of FIG. 11 is similar to that of FIGS. 7 and 10. Accordingly, additional descriptions will be omitted below to avoid redundancy.

In FIGS. 7 and 10, the temperature margin is set based on the distance-delay table corresponding to any one of the first chip or the second chip, whereas the temperature margin setting method of FIG. 11 may set the temperature margin using both the first distance-delay table corresponding to the first chip and the second distance-delay table corresponding to the second chip. In this case, the delay deviation corresponding to a first timing path length D1 of the first chip is selected with reference to the first distance-delay table corresponding to the first chip, and the delay deviation corresponding to a second timing path length D2 of the second chip is selected with reference to the second distance-delay table corresponding to the second chip.

FIG. 12 is a flowchart illustrating an operation of a temperature margin setting method of FIG. 11.

In operation S310, the thermal analysis tool 1230 generates a first distance-delay table corresponding to the first die of the 3D integrated circuit.

In operation S320, the thermal analysis tool 1230 generates a second distance-delay table corresponding to the second die of the 3D integrated circuit.

In operation S330, the static timing analysis tool 1250 calculates a distance of the first timing path corresponding to the first logic circuit of the first die.

In operation S340, referring to the first distance-delay table, the static timing analysis tool 1250 selects a delay deviation matching the distance of the first timing path, and decides a temperature delay corresponding thereto.

In operation S350, the static timing analysis tool 1250 calculates a distance of the second timing path corresponding to the second logic circuit of the second die.

In operation S360, referring to the second distance-delay table, the static timing analysis tool 1250 selects a delay deviation matching the distance of the second timing path, and decides a temperature delay corresponding thereto.

As described above, the 3D integrated circuit design apparatus 1000 according to an embodiment of the present disclosure may calculate a timing path distance corresponding to each stacked chip when setting a temperature margin with respect to a 3D signal transfer path and may set the temperature margin based on the distance with respect to the each calculated timing path, but may differently set the delay deviation with respect to each layer. Accordingly, a more accurate temperature margin may be set.

FIG. 13 is a diagram illustrating a temperature margin setting method, according to another embodiment of the present disclosure. The method of setting the temperature margin of FIG. 13 is similar to that of FIG. 7. Accordingly, redundant descriptions will be omitted below.

In FIG. 7, after calculating the first timing path distance D1 corresponding to the first logic circuit of the first die and calculating the second timing path distance D2 corresponding to the second logic circuit of the second die, a 3D timing path distance is derived by summing the first timing path distance D1 and the second timing path distance D2.

In addition, in FIG. 13, a third timing path D3 in the vertical direction (i.e., in the direction in which the chips are stacked) may be added. In detail, the 3D timing path distance may be defined as a sum (D1+D2+D3) of the first, second, and third timing paths. In this case, the distance-delay table corresponding to the third timing path distance D3 may be set in various ways. For example, one of the first distance-delay table corresponding to the first die or the second distance-delay table corresponding to the second die may be set to correspond to the third timing path distance D3. Alternatively, as another example, a distance-delay table corresponding to the third timing path distance D3 may be separately defined and used.

According to an embodiment of the present disclosure, a 3D integrated circuit design method may improve the performance of the 3D semiconductor device and may reduce or prevent the occurrence of problems due to the OCV, by setting a temperature margin based on the distance of the timing path for each of the stacked chips.

The above description is provided with reference to specific embodiments for carrying out the present disclosure. Embodiments in which a design is changed or variations thereof may be included in the present disclosure as well as the embodiments described above. In addition, technologies that are changed and implemented by using the above embodiments may be included in the present disclosure. That is, while the present disclosure has been described with reference to embodiments thereof, it will be apparent to those of ordinary skill in the art that various changes and modifications may be made thereto without departing from the scope of the present disclosure as set forth in the following claims.

What is claimed is:

1. A method of setting a temperature margin when designing a 3D (three-dimensional) integrated circuit, the method comprising:
    generating a distance-delay table with respect to at least one of a first chip and a second chip stacked on the first chip, based on a thermal analysis result;
    calculating a first timing path distance with respect to a first timing path corresponding to the first chip in a 3D signal transfer path;
    calculating a second timing path distance with respect to a second timing path corresponding to the second chip in the 3D signal transfer path;
    calculating a 3D timing path distance by summing the first timing path distance and the second timing path distance; and
    setting a temperature margin based on the distance-delay table and the 3D timing path distance.

2. The method of claim 1, wherein the distance-delay table is formed based on the thermal analysis result with respect to the first chip, and
    wherein the temperature margin is set with reference to the distance-delay table with respect to the first chip.

3. The method of claim 1, wherein the distance-delay table is formed based on the thermal analysis result with respect to the second chip located on top of the first chip, and
    wherein the temperature margin is set with reference to the distance-delay table with respect to the second chip.

4. The method of claim 1, wherein the generating of the distance-delay table includes:
    generating a first distance-delay table including delay deviation values for each distance with respect to the first chip; and
    generating a second distance-delay table including delay deviation values for each distance with respect to the second chip, and
    wherein the delay deviation values of the first distance-delay table are greater than or equal to the delay deviation values of the second distance-delay table of a corresponding distance.

5. The method of claim 1, wherein the generating of the distance-delay table includes:
    generating a coordinate-temperature table including information on a temperature distribution of devices of a selected chip among the first chip and the second chip;
    generating a temperature-delay table including information on thermal gradients of the devices of the selected chip; and
    generating a distance-delay table including delay deviation values according to distances in which temperature change information of the devices of the selected chip is reflected by integrating the coordinate-temperature table and the temperature-delay table.

6. The method of claim 5, wherein the generating of the distance-delay table further includes:

generating a distance-temperature graph including information on a temperature difference according to a distance difference between the devices of the selected chip based on the coordinate-temperature table.

7. The method of claim 1, further comprising:

calculating a third timing path distance with respect to a third timing path corresponding to a contact connecting the first chip and the second chip to each other in a vertical direction in the 3D signal transfer path, and wherein the 3D timing path distance is calculated by summing the first timing path distance, the second timing path distance, and the third timing path distance.

8. A method of setting a temperature margin when designing a 3D (three-dimensional) integrated circuit, the method comprising:

generating a first distance-delay table with respect to a first chip, based on a thermal analysis result;

generating a second distance-delay table with respect to a second chip stacked on top of the first chip, based on the thermal analysis result;

calculating a first timing path distance with respect to a first timing path corresponding to the first chip in a 3D signal transfer path;

setting a temperature margin with respect to the first timing path based on the first distance-delay table and the first timing path distance;

calculating a second timing path distance with respect to a second timing path corresponding to the second chip in the 3D signal transfer path; and setting a temperature margin with respect to the second timing path based on the second distance-delay table and the second timing path distance.

9. The method of claim 8, wherein delay deviation values of the first distance-delay table are greater than or equal to delay deviation values of the second distance-delay table of a corresponding distance.

10. The method of claim 8, wherein each of the generating of the first distance-delay table and the generating of the second distance-delay table includes:

generating a coordinate-temperature table including information on a temperature distribution of devices of a selected chip among the first chip and the second chip;

generating a temperature-delay table including information on thermal gradients of the devices of the selected chip; and generating a distance-delay table including delay deviation values according to distances in which temperature change information of the devices of the selected chip is reflected by integrating the coordinate-temperature table and the temperature-delay table.

11. The method of claim 10, wherein each of the generating of the first distance-delay table and the generating of the second distance-delay table further includes:

generating a distance-temperature graph including information on a temperature difference according to a distance difference between the devices of the selected chip based on the coordinate-temperature table.

12. An apparatus of designing a 3D integrated circuit including a processor and a memory device, the apparatus comprising:

the processor is configured to load a design tool into the memory device and execute the design tool that is loaded, and wherein the design tool includes:

a thermal analysis tool configured to generate a distance-delay table with respect to at least one of a first chip and a second chip stacked on the first chip, based on a thermal analysis result; and a static timing analysis tool configured to respectively calculate a first timing path distance corresponding to the first chip and a second timing path distance corresponding to the second chip in a 3D signal transfer path, and to set a temperature margin with respect to the 3D signal transfer path based on the first and second timing path distances and the distance-delay table.

13. The apparatus of claim 12, wherein the thermal analysis tool includes a thermal gradient analysis module configured to generate a coordinate-temperature table including heat distribution information with respect to devices of a selected chip of the first chip and the second chip.

14. The apparatus of claim 13, wherein the thermal analysis tool further includes a temperature-delay analysis module configured to generate a temperature-delay table including delay deviation information depending on a thermal gradient with respect to the 3D signal transfer path.

15. The apparatus of claim 14, wherein the thermal analysis tool further includes a distance-delay analysis module configured to generate a distance-delay table including delay deviation information depending on distance of the devices of the selected chip by integrating the coordinate-temperature table and the temperature-delay table.

16. The apparatus of claim 13, wherein the thermal gradient analysis module generates a distance-temperature graph including information on a temperature difference according to a distance difference between the devices of the selected chip based on the coordinate-temperature table.

17. The apparatus of claim 12, wherein the static timing analysis tool includes:

a 3D distance calculation module configured to separately calculate the first timing path distance and the second timing path distance; and a temperature margin decision module configured to set the temperature margin with respect to the 3D signal transfer path based on the first and second timing path distances and the distance-delay table.

18. The apparatus of claim 17, wherein the 3D distance calculation module calculates a 3D timing path distance by summing the first timing path distance and the second timing path distance, and wherein the temperature margin decision module sets the temperature margin with respect to the 3D signal transfer path based on the 3D timing path distance and a distance-delay table corresponding to a selected chip among the first chip and the second chip.

19. The apparatus of claim 17, wherein the 3D distance calculation module further calculates a third timing path distance with respect to a third timing path corresponding to a contact connecting the first chip and the second chip to each other in a vertical direction, and calculates a 3D timing path distance by summing the first to third timing path distances.

20. The apparatus of claim 17, wherein the temperature margin decision module sets a temperature margin with respect to the first chip based on a first distance-delay table corresponding to the first chip, and sets a temperature margin with respect to the second chip based on a second distance-delay table corresponding to the second chip.

* * * * *